(12) United States Patent
Kaneko et al.

(10) Patent No.: US 12,187,129 B2
(45) Date of Patent: Jan. 7, 2025

(54) STRADDLED VEHICLE

(71) Applicant: YAMAHA HATSUDOKI KABUSHIKI KAISHA, Iwata (JP)

(72) Inventors: Kyohei Kaneko, Shizuoka (JP); Yasushi Takemoto, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 623 days.

(21) Appl. No.: 17/505,475

(22) Filed: Oct. 19, 2021

(65) Prior Publication Data

US 2022/0033034 A1 Feb. 3, 2022

Related U.S. Application Data

(63) Continuation-in-part of application No. PCT/JP2020/016385, filed on Apr. 14, 2020.

(30) Foreign Application Priority Data

Apr. 14, 2020 (WO) ................. PCT/JP2020/016385

(51) Int. Cl.
| | |
|---|---|
| *B60K 6/46* | (2007.10) |
| *B60K 6/54* | (2007.10) |
| *B62J 43/16* | (2020.01) |
| *B62M 7/04* | (2006.01) |
| *B62K 11/06* | (2006.01) |

(Continued)

(52) U.S. Cl.
CPC ................. *B60K 6/46* (2013.01); *B60K 6/54* (2013.01); *B62J 43/16* (2020.02); *B62M 7/04* (2013.01); *B60Y 2200/126* (2013.01); *B60Y 2200/92* (2013.01); *B62K 11/06* (2013.01); *B62M 11/04* (2013.01); *F16H 57/02* (2013.01);
(Continued)

(58) Field of Classification Search
CPC ............... B60K 6/46; B60K 6/54; B62J 43/16
See application file for complete search history.

(56) References Cited

U.S. PATENT DOCUMENTS 9,160,214 B2 * 10/2015 Matsuda .................. B62J 43/16
9,796,289 B2 * 10/2017 Murase .................... B62J 43/16
(Continued)

FOREIGN PATENT DOCUMENTS

| EP | 2556977 A1 | 2/2013 |
|---|---|---|
| EP | 3147199 A2 | 3/2017 |

(Continued)

*Primary Examiner* — Kevin Hurley
(74) *Attorney, Agent, or Firm* — Rabin & Berdo, P.C.

(57) ABSTRACT

A straddled vehicle, including a frame structure, a rear arm, a driving wheel rotatably supported by the rear arm, a power source unit, and a drive unit including a gear box, a drive motor and a control unit. The drive motor is arranged with an off-set toward a first direction from a center of the straddled vehicle, without overlapping the power source unit in a side view. The control unit is further in a second direction than the drive motor, and overlaps the drive motor, but does not overlap the power source unit, in the side view. The gear box is further in the second direction than the drive motor, and overlaps the drive motor in the side view. The gear box is also further in the first direction than the control unit, and overlaps with the control unit, but does not overlap the power source unit, in the side view.

12 Claims, 10 Drawing Sheets

(51) Int. Cl.
*B62M 11/04* (2006.01)
*F16H 57/02* (2012.01)
(52) U.S. Cl.
CPC ............ *F16H 2057/02034* (2013.01); *F16H 2057/02065* (2013.01)

(56) References Cited

U.S. PATENT DOCUMENTS

| | | | |
|---|---|---|---|
| 10,000,255 B2 * | 6/2018 | Shahana | ................ B62M 6/55 |
| 2012/0111651 A1 | 5/2012 | Irie et al. | |
| 2013/0168171 A1 | 7/2013 | Buell et al. | |
| 2016/0288872 A1 * | 10/2016 | Shahana | .............. B62K 25/286 |
| 2023/0109484 A1 * | 4/2023 | Ueno | ..................... B62J 17/10 |
| | | | 180/68.1 |
| 2023/0182851 A1 * | 6/2023 | Kashihara | ................ B62J 43/16 |
| | | | 180/219 |

FOREIGN PATENT DOCUMENTS

| | | | |
|---|---|---|---|
| JP | H10297570 A | | 11/1998 |
| JP | 2001114184 A | | 4/2001 |
| JP | 2003-191883 A | | 7/2003 |
| JP | 2012-101679 A | | 5/2012 |
| JP | 2015-089756 A | | 5/2015 |
| JP | 2015085797 A | | 5/2015 |
| JP | 2016193628 A | | 11/2016 |
| JP | 2016-215668 A | | 12/2016 |
| JP | 2017-065318 A | | 4/2017 |
| JP | 2020175822 A | * | 10/2020 |
| WO | 2012057711 A | | 5/2012 |

* cited by examiner

STRADDLED VEHICLE

CROSS-REFERENCE TO RELATED APPLICATIONS

This is a continuation-in-part application of International Application PCT/JP2020/016385 filed on Apr. 14, 2020, which claims priority from an International Application PCT/JP2019/016856, filed on Apr. 19, 2019. The contents of the applications are incorporated herein by reference.

TECHNICAL FIELD

The present teaching relates to a straddled vehicle.

BACKGROUND ART

Patent Literature 1 (PTL 1) shows a hybrid type straddled vehicle of which the motor is driven by electric power from an electric power generator and/or a battery. The straddled vehicle according to PTL 1 includes rotational power components such as an engine, an electric power generator, a battery, a drive motor, and a control unit. The straddled vehicle according to PTL 1 is designed such that these rotational power components are arranged near the center of a vehicle body. Patent Literatures 2 and 3 (PTL 2 and PTL 3) each show an electric straddled vehicle that is driven by a motor. A two-wheeled vehicle according to each of PTL 2 and PTL 3 includes rotational power components such as a battery and a motor. In addition, in each of PTL 2 and PTL 3, the straddled vehicle is designed such that these rotational power components are arranged near the center of a vehicle body.

CITATION LIST

Patent Literature

PTL 1: Specification of United States Patent Application Publication No. 2013/0168171
PTL 2: Japanese Patent Application Laid-Open No. 2017-065318
PTL 3: Japanese Patent Application Laid-Open No. 2015-089756

SUMMARY OF INVENTION

Technical Problem

A straddled vehicle, unlike a four-wheeled car, does not have a space for arrangement of a large rotational power component. Therefore, it is required that the straddled vehicle is to be a compact vehicle. However, many of the rotational power components mounted to the straddled vehicles according to PTL 1 to PTL 3 are large.

The straddled vehicle according to PTL 1 is different from the straddled vehicles according to PTL 2 and PTL 3, in terms of a rotational power supply system. Each of the straddled vehicles has a specially designed arrangement of the rotational power components. In straddled vehicles, it's desired that a versatile vehicle body is to be compatible with various rotational power systems.

The present teaching aims to provide a straddled vehicle including a compact and versatile vehicle body that is compatible with various rotational power systems.

Solution to the Problem

The inventors of the present teaching conducted detailed studies on arrangement of each of many rotational power components in a compact manner in a straddled vehicle. The inventors of the present teaching consequently discovered the following.

For example, to allow a straddled vehicle to be actualized in both types of a hybrid vehicle and an electric vehicle, a rotational power component common to both of the vehicles is arranged in a common place, while a rotational power component specific to either one of the vehicles is mounted suitably for the one of the vehicles. This can provide compact arrangement of rotational power components, according to the discovery. More specifically, a frame body that constitutes at least a part of a frame structure supports a drive unit on the frame body, the drive unit including a drive motor, a control unit, and a gear box. If a battery unit is attached to the frame structure in this state, an electric type straddled vehicle can be produced. If an electric power generation unit is attached to the frame structure, a series hybrid type straddled vehicle can be produced. The frame structure supports a swingable rear arm, the rear arm supporting a rotatable driving wheel.

Arrangement of the rotational power components of the straddled vehicle in this manner enables the straddled vehicle to have a compact vehicle body, and further to have a versatile vehicle body that is compatible with various rotational power systems.

A straddled vehicle, according to the present teaching accomplished based on the above-described findings, has the following configuration.

(1) A straddled vehicle including:
a frame body that constitutes at least a part of a frame structure;
a driving wheel supported by a rear arm that is to be rotatable, the rear arm supported by the frame structure that is to be swingable;
a power source unit for supplying electric power, the power source unit being provided to the frame structure; and
a drive unit including a drive motor, a control unit, and a gear box,
the drive motor being configured to receive electric power supplied from the power source unit, and drive the driving wheel, the drive motor being arranged off-set toward a first direction from the center of the straddled vehicle with respect to a left-right direction of the straddled vehicle, provided that the left-right direction is composed of the first direction and a second direction opposite to the first direction, the drive motor being arranged so as not to overlap the power source unit when viewed in the left-right direction,
the control unit being configured to control electric power to be supplied from the power source unit to the drive motor, the control unit being positioned farther in the second direction than the drive motor, the control unit being arranged so as to have an overlap with the drive motor when viewed in the left-right direction, the control unit being arranged so as not to overlap the power source unit when viewed in the left-right direction,
the gear box accommodating a rotational power transmission mechanism that shifts the speed of power outputted from the drive motor with a predetermined gear ratio, and transmits the resulting power to the driving wheel, the gear box being provided to the frame body, the gear box being configured such that the drive motor and the control unit are provided thereto, the gear box being positioned farther in the second direction than the drive motor, the gear box being arranged so as to have an overlap with the drive motor when viewed in the left-right direction, the gear box being positioned farther in the first direction than the control unit, the gear box being arranged so as to have an overlap with the control unit when viewed in the left-right direction, the gear box being arranged so as not to overlap the power source unit when viewed in the left-right direction.

The straddled vehicle according to (1) includes the frame body, the driving wheel, the power source unit, and the drive unit.

The frame body constitutes at least a part of the frame structure.

The rear arm is supported by the frame structure to be swingable.

The driving wheel is supported by the rear arm to be rotatable.

The power source unit is provided to the frame structure, and supplies electric power.

The drive unit includes the drive motor, the control unit, and the gear box.

The drive motor is provided to the gear box.

The drive motor receives electric power supplied from the power source unit, and drives the driving wheel.

The drive motor is arranged so as to satisfy the following conditions (i) and (ii).

(i) The drive motor is arranged off-set toward the first direction from the center of the straddled vehicle with respect to the left-right direction of the straddled vehicle, provided that the left-right direction is composed of the first direction and the second direction opposite to the first direction.

(ii) The drive motor is arranged so as not to overlap the power source unit when viewed in the left-right direction of the straddled vehicle.

The control unit is provided to the gear box.

The control unit controls electric power to be supplied from the power source unit to the drive motor.

The control unit is arranged so as to satisfy the following conditions (iii) to (v).

(iii) The control unit is positioned farther in the second direction than the drive motor with respect to the left-right direction of the straddled vehicle, provided that the left-right direction is composed of the first direction and the second direction opposite to the first direction.

(iv) The control unit is arranged so as to have an overlap with the drive motor when viewed in the left-right direction of the straddled vehicle.

(v) The control unit is arranged so as not to overlap the power source unit when viewed in the left-right direction of the straddled vehicle.

The gear box accommodates the rotational power transmission mechanism that shifts the speed of power outputted from the drive motor with a predetermined gear ratio, and transmits the resulting power to the driving wheel.

The gear box is provided to the frame body, for example.

The gear box is arranged so as to satisfy the following conditions (vi) to (x).

(vi) The gear box is positioned farther in the second direction than the drive motor with respect to the left-right direction of the straddled vehicle, provided that the left-right direction is composed of the first direction and the second direction opposite to the first direction.

(vii) The gear box is arranged so as to have an overlap with the drive motor when viewed in the left-right direction of the straddled vehicle.

(viii) The gear box is positioned farther in the first direction than the control unit with respect to the left-right direction of the straddled vehicle, provided that the left-right direction is composed of the first direction and the second direction opposite to the first direction.

(ix) The gear box is arranged so as to have an overlap with the control unit when viewed in the left-right direction of the straddled vehicle.

(x) The gear box is arranged so as not to overlap the power source unit when viewed in the left-right direction of the straddled vehicle.

The straddled vehicle according to (1) has, as its component parts, the drive motor, the control unit, and the gear box provided to the frame body, which are rotational power components common to a hybrid vehicle and an electric vehicle. Accordingly, with parts corresponding to various rotational power systems being attached to the frame structure, the straddled vehicle according to (1) is allowed to be compatible with the various rotational power systems. For example, by attaching a battery to the frame structure, an electric type straddled vehicle can be produced. By attaching an engine type electric power generator to the frame structure, a series hybrid type straddled vehicle can be produced. In the straddled vehicle according to (1), a compact vehicle body can be obtained, and furthermore a versatile vehicle body that is compatible with various rotational power systems can be obtained.

In an aspect of the present teaching, the straddled vehicle can adopt the following configuration.

(2) The straddled vehicle according to (1) is configured such that the gear box is fixed to the frame body, and partners with the frame body to constitute at least a part of the frame structure.

In the straddled vehicle according to (2), the gear box is fixed to the frame body, and the gear box and the frame body constitute the frame structure. In the straddled vehicle according to (2), the frame body is fixed to the gear box, which is a highly rigid part, and therefore the rigidity of the frame structure can be enhanced by the gear box and the frame body. Accordingly, in the straddled vehicle according to (2), a compact and strong vehicle body can be obtained, and furthermore a versatile vehicle body that is compatible with various rotational power systems can be obtained.

In an aspect of the present teaching, the straddled vehicle can adopt the following configuration.

(3) The straddled vehicle according to (1) or (2) is configured such that the gear box has a gear case of left and right split type, the gear case being capable of splitting in the left-right direction of the straddled vehicle.

The straddled vehicle according to (3) has the gear case of left and right split type. In the straddled vehicle according to (3), therefore, it is possible that parts are respectively supported by left and right portions of the gear case of the gear box. In the straddled vehicle according to (3), a compact vehicle body can be obtained because it is possible that the drive motor and the control unit are supported by the left and right portions of the gear box.

For example, one of the left and right portions of the gear case can be shaped to be capable of receiving the drive motor.

In an aspect of the present teaching, the straddled vehicle can adopt the following configuration.

(4) The straddled vehicle according to (3) is configured such that
- the gear box accommodates a rotational power transmission mechanism including an input shaft, a speed reduction shaft, and an output shaft,
- the input shaft, the speed reduction shaft, and the output shaft are arranged in parallel or substantially in parallel to one another, and
- the input shaft, the speed reduction shaft, and the output shaft are arranged such that their axes are not collinear when viewed in the axial direction of the input shaft, the axial direction of the speed reduction shaft, and the axial direction of the output shaft.

In the straddled vehicle according to (4), the axes of the input shaft, the speed reduction shaft, and the output shaft of the gear box are not collinear when viewed in their axial directions. This can shorten the clearance between the input shaft and the output shaft in the straddled vehicle according to (4). Consequently, in the straddled vehicle according to (4), the gear box can be compact. The axial directions of the input shaft, the speed reduction shaft, and the output shaft are coincident with the left-right direction of the straddled vehicle, for example. The axes of the input shaft, the speed reduction shaft, and the output shaft are, for example, at the vertices of a triangle when viewed in the left-right direction of the straddled vehicle.

In an aspect of the present teaching, the straddled vehicle can adopt the following configuration.

(5) The straddled vehicle according to any one of (1) to (4) is configured such that:
- the power source unit includes
    - an electric power generation engine having a rotatable crankshaft, the electric power generation engine being configured to generate power by gas combustion, and output the power in the form of a torque and a rotation speed of the crankshaft,
    - an electric power generator that is provided so as to be in conjunction with the crankshaft, the electric power generator being driven by the electric power generation engine, to generate electric power, and
    - a battery;
- the electric power generator supplies electric power to the battery and/or the drive motor;
- the battery is fixed to the frame structure; and
- the control unit further controls electric power to be supplied from the electric power generator to the battery and/or the drive motor.

The straddled vehicle according to (5) includes the electric power generation engine, the electric power generator, and the battery. That is, the straddled vehicle according to (5) has an engine type electric power generator, which is attached to the frame structure. The straddled vehicle according to (5) makes it possible to produce a series hybrid type straddled vehicle having a compact vehicle body.

In an aspect of the present teaching, the straddled vehicle can adopt the following configuration.

(6) The straddled vehicle according to (5) is configured such that
- the electric power generation engine is supported by the frame structure to be swingable such that the electric power generation engine does not constitute the frame structure.

In the straddled vehicle according to (6), transmission of vibration from the electric power generation engine to the frame structure can be suppressed.

In an aspect of the present teaching, the straddled vehicle can adopt the following configuration.

(7) The straddled vehicle according to (5) is configured such that
- the electric power generation engine is fixed to the frame structure, and constitutes at least a part of the frame structure.

In the straddled vehicle according to (7), the electric power generation engine can be a rigid member of the frame structure.

In an aspect of the present teaching, the straddled vehicle can adopt the following configuration.

(8) The straddled vehicle according to any one of (5) to (7) is configured such that
- the battery is capable of being supplied with electric power from a power source that is different from the electric power generator.

Via the battery, the straddled vehicle according to (8) can be supplied with electric power from the power source that is different from the electric power generator of the straddled vehicle. Accordingly, the configuration of (8) can provide an electric type straddled vehicle equipped with a range extender, the electric type straddled vehicle having a compact and strong vehicle body.

In an aspect of the present teaching, the straddled vehicle can adopt the following configuration.

(9) The straddled vehicle according to any one of (1) to (4) is configured such that
- the power source unit is a battery unit including one or more batteries.

The straddled vehicle according to (9) includes the battery unit composed of one or more batteries. The configuration of (9) can provide an electric type straddled vehicle that is compact and has a good strength.

The terminology used herein is for defining particular embodiments only and is not intended to limit the teaching. As used herein, the term "and/or" includes any and all combinations of one or more of the associated listed items. As used herein, the terms "including", "comprising", or "having", and variations thereof specify the presence of stated features, steps, elements, components, and/or equivalents thereof, and can include one or more of steps, operations, elements, components, and/or their groups. As used herein, the terms "attached", "connected", "coupled", and/or equivalents thereof are used in a broad sense, and include both of direct and indirect attachment and coupling unless otherwise specified. The terms "connected" and "coupled" are not limited to physical or mechanical connection or coupling, and can include direct and indirect electrical connection and coupling. Unless otherwise defined, all terms (including technical and scientific terms) used herein have the same meaning as commonly understood by one of ordinary skill in the art to which the present teaching belongs. It will be further understood that terms, such as those defined in commonly used dictionaries, should be interpreted as having a meaning that is consistent with their meaning in the context of the present teaching and relevant art and should not be interpreted in an idealized or overly formal sense unless expressly so defined herein. It will be understood that the description of the present teaching discloses a number of techniques and steps. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims.

Description herein will give an explanation about a novel straddled vehicle. In the description given below, for the purposes of explanation, numerous specific details are set forth in order to provide a thorough understanding of the present teaching. It will be apparent, however, that those skilled in the art may practice the present teaching without these specific details. The present disclosure is to be considered as an exemplification of the present teaching, and is not intended to limit the present teaching to the specific embodiments illustrated by drawings or descriptions below.

The straddled vehicle (straddled vehicle) refers to a vehicle of a type including a saddle on which a driver can sit astride. Examples of the straddled vehicle encompass a scooter type motorcycle, a moped type motorcycle, an off-road type motorcycle, and an on-road type motorcycle. The straddled vehicle is not limited to motorcycles. Alternatively, for example, the straddled vehicle may be a three-wheeled motor vehicle, an all-terrain vehicle (ATV), or the like. The three-wheeled motor vehicle may include two front wheels and one rear wheel. Alternatively, the three-wheeled motor vehicle may include one front wheel and two rear wheels. The driving wheel of the straddled vehicle may be either a rear wheel or a front wheel. Alternatively, both the rear wheel and the front wheel may serve as driving wheels of the straddled vehicle.

The straddled vehicle is preferably capable of making a turn in a leaning posture. The straddled vehicle capable of making a turn in a leaning posture is configured to make a turn while leaning toward the inside of a curve. With this, the straddled vehicle capable of making a turn in a leaning posture can resist against a centrifugal force acting on the straddled vehicle during a turn. The straddled vehicle capable of making a turn in a leaning posture may be a motorcycle or a three-wheeled motor vehicle, for example. Since the straddled vehicle capable of making a turn in a leaning posture is required to have agility, the responsiveness of running to a manipulation for starting is highly valued.

The straddled vehicle is a series hybrid type straddled vehicle, for example. The straddled vehicle is not particularly limited, and for example, may be an electric type straddled vehicle. The electric type straddled vehicle may be provided with a range extender and serve as an electric type straddled vehicle equipped with a range extender, for example.

In the series hybrid type straddled vehicle, the driving wheel is driven by power that is outputted from the drive motor. The driving wheel is separated from a path through which rotational power from the crankshaft is transmitted. The driving wheel, therefore, is configured such that power outputted by the electric power generation engine is not mechanically transmitted to the driving wheel. That is, the series hybrid type straddled vehicle in the present disclosure does not encompass a so-called series-parallel hybrid type straddled vehicle.

In the electric type straddled vehicle equipped with a range extender, the drive motor is driven by electric power from the battery and/or the electric power generator of the electric power generation unit. In the electric type straddled vehicle equipped with a range extender, the battery is allowed to be supplied with electric power not only from the electric power generator mounted to the straddled vehicle but also from an external power source. Examples of the external power source include a home power source and a power source installed in an electric power supply station for electric cars.

In the electric type straddled vehicle, the drive motor is driven only by electric power supplied from the battery unit. In other words, the electric type straddled vehicle includes neither a driving engine nor an electric power generation engine.

The frame body constitutes a framework of the straddled vehicle, and supports mounted parts of the straddled vehicle, and the like. The mounted parts vary depending on the type of the straddled vehicle, for example. Examples of the mounted parts include an engine, an electric power generation unit, a drive unit, a battery, a fuel tank, and the like. The frame body is composed of a head pipe and a beam portion fixed to the head pipe, for example. The frame body may be composed of a head pipe, a beam portion, and other parts, or may be composed of parts other than a head pipe and a beam portion. The beam portion may be made of a single pipe, or may be made of a combination of two or more pipes. The beam portion may have a structure other than a pipe, such as a plate. Non-limiting examples of the frame body include a single cradle, a double cradle, a diamond type, and a monocoque type. The frame structure is constituted by the frame body in combination with a rigid part that is rigidly fixed to the frame body. The frame body and the rigid part of the frame structure are unified to bear loads from the front wheel and the rear wheel. The term "rigid part" as used herein includes a metal-made structure, frame member, or housing, for example. For example, like the frame body, the rigid part can constitute the framework of the straddled vehicle, and can support mounted parts of the straddled vehicle, and the like. A part that can be the "rigid part" may be a power source unit or a drive unit, for example. The part that can be the "rigid part" may be a drive motor, a control unit, or a gear unit, for example. The part that can be the "rigid part" may be an electric power generation engine, an electric power generator, a battery, or a battery unit, for example. The battery unit includes one or more batteries.

The electric power generation engine is a reciprocating engine that generates power by gas combustion, and outputs the power in the form of a torque and a rotation speed of the crankshaft. The electric power generation engine encompasses, for example, a single cylinder engine and an engine having two or more cylinders. Non-limiting examples of the electric power generation engine include a rotary engine and a gas turbine engine in addition to the reciprocating engine that generates power by gas combustion, and outputs the power in the form of a torque and a rotation speed of the crankshaft.

The electric power generator is a rotating electric machine capable of generating electric power. The electric power generator may function as a starter motor. Alternatively, the electric power generator may be a rotating electric machine different from a starter motor. The electric power generator may be either of outer rotor type or of inner rotor type. The electric power generator may be either of radial gap type or of axial gap type. In an embodiment, the electric power generator has a rotor including a permanent magnet.

The configuration in which the electric power generator is driven by the electric power generation engine is, for example, a configuration in which the electric power generator is provided so as to be in conjunction with the crankshaft of the electric power generation engine, and a driven shaft of the electric power generator is connected to the crankshaft of the electric power generation engine via a rotational power transmission mechanism such that the driven shaft is rotated at a fixed speed ratio. A configuration in which the electric power generator is directly coupled to the crankshaft of the electric power generation engine without interposition of the rotational power transmission mechanism may be possible, too.

As the power source unit, the electric power generation unit and the battery unit may be mentioned. The electric power generation unit includes the electric power generation engine and the electric power generator. The electric power generation unit may include the battery. The electric power generation unit converts rotational power outputted from the electric power generation engine into electric power. The battery unit includes one or more batteries. The battery is an energy storage device for charging electric power. The battery outputs electric power. The battery is supplied with electric power generated by the electric power generator. No particular limitation is put on electric power supplied to the battery. For example, electric power generated by the drive motor may be supplied to the battery. In other words, the battery may be charged with electric power regenerated by the drive motor.

The drive motor is a rotating electric machine capable of motor operations. The drive motor may be a rotating electric machine capable of both electric power generation and motor operations, for example. The drive motor may be either of outer rotor type or of inner rotor type. The drive motor may be either of radial gap type or of axial gap type. In an embodiment, the drive motor has a rotor including a permanent magnet.

The driving wheel may be either the rear wheel or the front wheel. Alternatively, both the rear wheel and the front wheel may serve as driving wheels.

The rear arm is a part connecting the rear wheel to the frame structure. The rear arm supports the rear wheel rotatably. The rear arm is swingably supported by the frame structure.

A condition where a configuration A is provided to a configuration B may mean that at least a part of the configuration A is provided to the configuration B, or may mean that the configuration A is entirely provided to the configuration B. The condition where the configuration A is provided to the configuration B may mean that the configuration A is provided to the configuration B with a fixture, or may mean that the configuration A is provided to the configuration B via a support. Examples of the fixture include, but are not limited to, a bolt and a nut. Examples of the support include, but are not limited to, a stay, a bracket, and the like. The condition where the configuration A is provided to the configuration B may mean that the configuration A is provided to the configuration B such that the configuration A is supported by the configuration B, or may mean that the configuration A is provided to the configuration B such that the configuration A is fixed to the configuration B.

The wording "supporting" means that a supporting part bears a load of a supported part. The wording "supported" means that a supported part applies a load to a supporting part. A contact point between the supporting part and the supported part may be fixed, for example. The supporting part and the supported part may be connected swingably, for example. The supporting part and the supported part may be connected rotatably, for example. A connecting portion between the supporting part and the supported part may be where the parts are directly connected to each other. The connecting portion between the supporting part and the supported part may be where the parts are connected to each other via an elastic member, a link mechanism, or the like, for example. A condition where a configuration A supports a configuration B means, for example, that the configuration B is provided to the configuration A such that the configuration A bears at least a part of a load of the configuration B or the entire load of the configuration B.

The wording "fixing" means that a supported part is in contact with and rigidly supported by a supporting part without interposition of any elastic member.

A condition of being supported by the frame structure so as not to constitute the frame structure means, for example, that the front wheel and the rear wheel, etc. are supported by the frame structure such that the front wheel and the rear wheel bear no load or a lower load from a part than a load that the frame structure bears from the part. The supporting is implemented by, for example, attaching at one or more points to the frame structure via or not via an elastic member such as a rubber. The supporting may be implemented by attaching at two or more points to the frame structure via an elastic member such as a rubber and a link mechanism.

The control unit is a drive control unit for controlling the drive motor, for example. The control unit may be a power source control unit for controlling the electric power generator, for example. The control unit may include both the drive control unit and the power source control unit. The control unit includes an inverter module. The inverter module may include an inverter and a motor controller (control device) for controlling the inverter, or may include the inverter alone. The drive control unit may include an attachment board to which the inverter module is attached. The power source control unit includes a converter module. The converter module may include a converter and an electric power generation controller (control device) for controlling the converter, or may include the converter alone. The power source control unit may include an attachment board to which the converter module is attached. The inverter module and the converter module may be attached to a single attachment board. The electric power generation controller and the motor controller may be constituted by a single control device including an ECU, for example. In this case, the electric power generation controller and the motor controller may not need to be included in the inverter module and in the converter module. The electric power generation controller and the motor controller (control device) may control electrical equipment different from the electric power generator and the drive motor. The electric power generation controller and the motor controller (control device) may have a processor that executes programs, or may be an electronic circuit.

In a case where the straddled vehicle is a two-wheeled vehicle, the center of the straddled vehicle with respect to the left-right direction of the straddled vehicle is represented by a vertical plane including the center of the front wheel and the center of the rear wheel under a state where the vehicle is upright. In a case where the straddled vehicle has two front wheels or two rear wheels, the center of the straddled vehicle is represented by a vertical plane including a position that is equally distant from the respective centers of the two front wheels with respect to the left-right direction, or a position that is equally distant from the respective centers of the two rear wheels with respect to the left-right direction. Here, the left-right direction is composed of a first direction and a second direction opposite to the first direction. When the first direction is rightward, the second direction is leftward. When the first direction is leftward, the second direction is rightward.

The left-right direction of the straddled vehicle is a left-right direction relative to a travel direction of the straddled vehicle under a state where the straddled vehicle is upright. The gear case of left and right split type, which is capable of splitting in the left-right direction, is formed such that, for example, a mating surface of the gear case extends in the front-back direction and the up-down direction of the straddled vehicle. The mating surface of the gear case of left and right split type is not limited to this, however. The mating surface may be inclined in the front-back direction and in the up-down direction, or may be bent. Furthermore, the mating surface may partially extend in the left-right direction.

Having an overlap includes a state where two or more objects have their portions overlap each other. That is, a partially overlapping state is included. Having an overlap also includes a case where objects completely overlap each other.

Not overlapping means that all of two or more objects have no portion overlap each other.

Advantageous Effects of Invention

According to the present teaching, a straddled vehicle can be provided with a compact and strong vehicle body, and furthermore with a versatile vehicle body that is compatible with various rotational power systems.

DESCRIPTION OF EMBODIMENTS

In the following, the present teaching will be described based on preferred embodiments with reference to the drawings.

Embodiment

Figure 1:
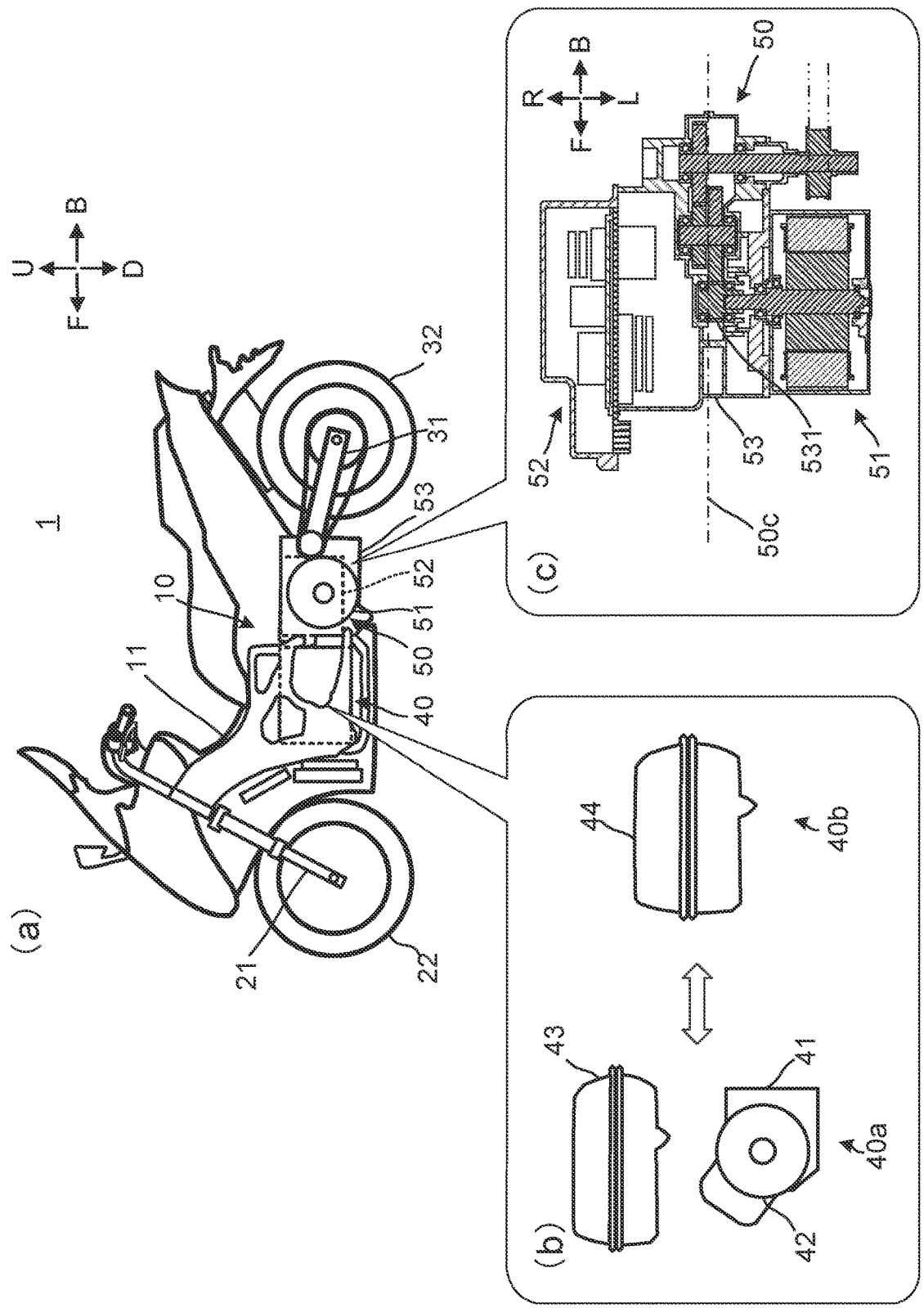
FIG. 1 A diagram showing an external appearance of a straddled vehicle according to an embodiment of the present teaching FIG. 2 A left side view of a drive unit of the straddled vehicle shown in FIG. 1

FIG. 1 is a diagram showing an external appearance of a straddled vehicle 1 according to an embodiment of the present teaching. The part (a) of FIG. 1 shows a state where a left one of vehicle body coverings in the left-right direction of the straddled vehicle 1 is removed.

Referring to FIG. 1, overview of the straddled vehicle 1 according to this embodiment will be described. In FIG. 1, the arrow F represents the frontward direction of the straddled vehicle 1. The frontward direction is a direction in which the straddled vehicle 1 travels. The arrow B represents the backward (rearward) direction. The arrow F and the arrow B represent the front-back (front-rear) direction FB of the straddled vehicle 1. The frontward direction F, the backward direction B, and the front-back direction FB are parallel to a horizontal plane under a state where the straddled vehicle 1 is upright. The arrow U represents the upward (upper) direction. The arrow D represents the downward (lower) direction. The arrow U and the arrow D represent the up-down direction UD of the straddled vehicle 1. The upward direction U, the downward direction D, and the up-down direction UD are parallel to the vertical direction under a state where the straddled vehicle 1 is upright. The part (c) of FIG. 1 shows the arrow L and the arrow R, which represent the right direction and the left direction from the perspective of a rider riding on a lean vehicle. The arrow L and the arrow R represent the left-right direction LR of the straddled vehicle 1.

In Description herein, directions in relation to a device included in the straddled vehicle 1 are described by using the foregoing directions, assuming a state where the device is mounted to the straddled vehicle 1.

The straddled vehicle 1 shown in FIG. 1 includes a frame structure 10. At least a part of the frame structure 10 is constituted by a frame body 11. In other words, the straddled vehicle 1 shown in FIG. 1 includes the frame body 11.

The straddled vehicle 1 includes a front fork 21 and a front wheel 22. The front wheel 22 is rotatably supported by the front fork 21. The front fork 21 is rotatably supported by the frame structure 10. The frame structure 10 bears a load from the front wheel 22 via the front fork 21.

The straddled vehicle 1 includes a rear arm 31 and a rear wheel 32. The rear wheel 32 is rotatably supported by the rear arm 31. The rear arm 31 is swingably supported by the frame structure 10. The frame structure 10 bears a load from the rear wheel 32 via the rear arm 31.

The straddled vehicle 1 includes a power source unit 40. In this embodiment, for example, the power source unit 40 is composed of an electric power generation unit 40a including an electric power generation engine 41, an electric power generator 42, and a battery 43, as shown in the part (b) of FIG. 1. In this case, the straddled vehicle 1 can be configured as a series hybrid type straddled vehicle. In another example, the power source unit 40 is a battery unit 40b consisting of a battery 44 alone. In this case, the straddled vehicle 1 can be configured as an electric type straddled vehicle.

The power source unit 40 is supported by the frame structure 10. The power source unit 40 is not supported by the rear arm 31.

The straddled vehicle 1 includes a drive unit 50. The part (c) of FIG. 1 shows a cross-sectional view of the drive unit 50 as cross-sectioned in a plane including a drive shaft of a drive motor 51 and an output shaft of a gear box 53. As shown in the part (c) of FIG. 1, the drive unit 50 includes the drive motor 51, a control unit 52, and the gear box 53.

The drive motor 51 is supported by the gear box 53. The drive motor 51 is supplied with electric power from the power source unit 40 to drive the rear wheel 32. As shown in the part (c) of FIG. 1, the drive motor 51 is arranged so as to satisfy the following conditions (i) and (ii).

(i) The drive motor 51 is arranged off-set toward a first direction from the center 50c of the straddled vehicle 1 with respect to the left-right direction LR of the straddled vehicle 1, provided that the left-right direction LR is composed of the first direction and a second direction opposite to the first direction. More specifically, in this embodiment, the drive motor 51 is arranged off-set toward the left direction L from the center 50c of the straddled vehicle 1 with respect to the left-right direction LR of the straddled vehicle 1.

(ii) The drive motor 51 is arranged so as not to overlap the power source unit 40 when viewed in the left-right direction LR of the straddled vehicle 1.

The control unit 52 is supported by the gear box 53. The control unit 52 controls electric power to be supplied from the power source unit 40 to the drive motor 51. In a case where the straddled vehicle 1 is configured as a series hybrid type straddled vehicle by using the electric power generation unit 40a as the power source unit 40, the control unit 52 also controls electric power to be supplied from the electric power generator 42 to the battery 43. As shown in the part (c) of FIG. 1, the control unit 52 is arranged so as to satisfy the following conditions (iii) to (v).

(iii) The control unit 52 is positioned farther in the second direction than the drive motor 51 with respect to the left-right direction LR of the straddled vehicle 1, provided that the left-right direction LR is composed of the first direction and the second direction opposite to the first direction. More specifically, in this embodiment, the control unit 52 is positioned farther in the right direction R than the drive motor 51 with respect to the left-right direction LR of the straddled vehicle 1.

(iv) The control unit 52 is arranged so as to have an overlap with the drive motor 51 when viewed in the left-right direction LR of the straddled vehicle 1.

(v) The control unit 52 is arranged so as not to overlap the power source unit 40 when viewed in the left-right direction LR of the straddled vehicle 1.

The gear box 53 accommodates a rotational power transmission mechanism 531 that shifts the speed of power outputted from the drive motor 51 with a predetermined gear ratio, and transmits the resulting power to the rear wheel 32 serving as the driving wheel. In this embodiment, the rotational power transmission mechanism 531 constitutes a speed reducer, for example. The gear box 53 is supported by the frame body 11.

As shown in the part (c) of FIG. 1, the gear box 53 is arranged so as to satisfy the following conditions (vi) to (x).

(vi) The gear box 53 is positioned farther in the second direction than the drive motor 51 with respect to the left-right direction LR of the straddled vehicle 1, provided that the left-right direction LR is composed of the first direction and the second direction opposite to the first direction. More specifically, the gear box 53 is positioned farther in the right direction R than the drive motor 51 with respect to the left-right direction LR of the straddled vehicle 1.

(vii) The gear box 53 is arranged so as to have an overlap with the drive motor 51 when viewed in the left-right direction LR of the straddled vehicle 1.

(viii) The gear box 53 is positioned farther in the first direction than the control unit 52 with respect to the left-right direction LR of the straddled vehicle 1, provided that the left-right direction LR is composed of the first direction and the second direction opposite to the first direction. More specifically, the gear box 53 is positioned farther in the left direction L than the control unit 52 with respect to the left-right direction LR of the straddled vehicle 1.

(ix) The gear box 53 is arranged so as to have an overlap with the control unit when viewed in the left-right direction LR of the straddled vehicle.

(x) The gear box 53 is arranged so as not to overlap the power source unit 40 when viewed in the left-right direction LR of the straddled vehicle 1.

The straddled vehicle 1 has, as its component parts, the drive motor 51, the control unit 52, and the gear box 53 supported by the frame body 11, which are rotational power components common to a hybrid vehicle and an electric vehicle. Accordingly, by attaching parts corresponding to various rotational power systems to the frame structure 10, the straddled vehicle 1 is allowed to be compatible with the various rotational power systems. For example, attaching a battery to the frame structure 10 can produce an electric type straddled vehicle. Attaching an engine type electric power generator to the frame structure 10 can produce a series hybrid type straddled vehicle. Accordingly, in the straddled vehicle 1, a compact vehicle body can be obtained, and furthermore a versatile vehicle body that is compatible with various rotational power systems can be obtained.

Figure 2:
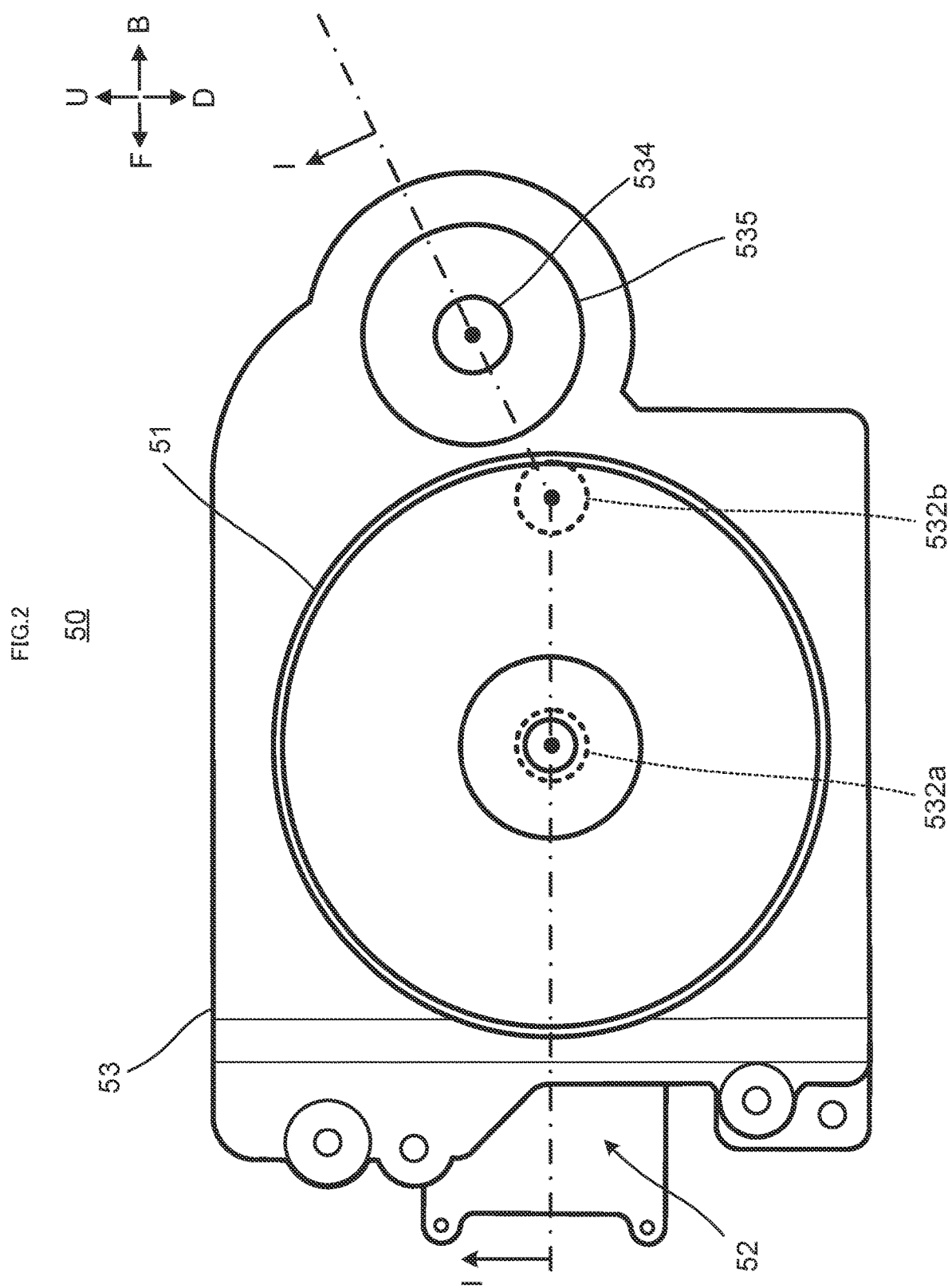
Figure 3:
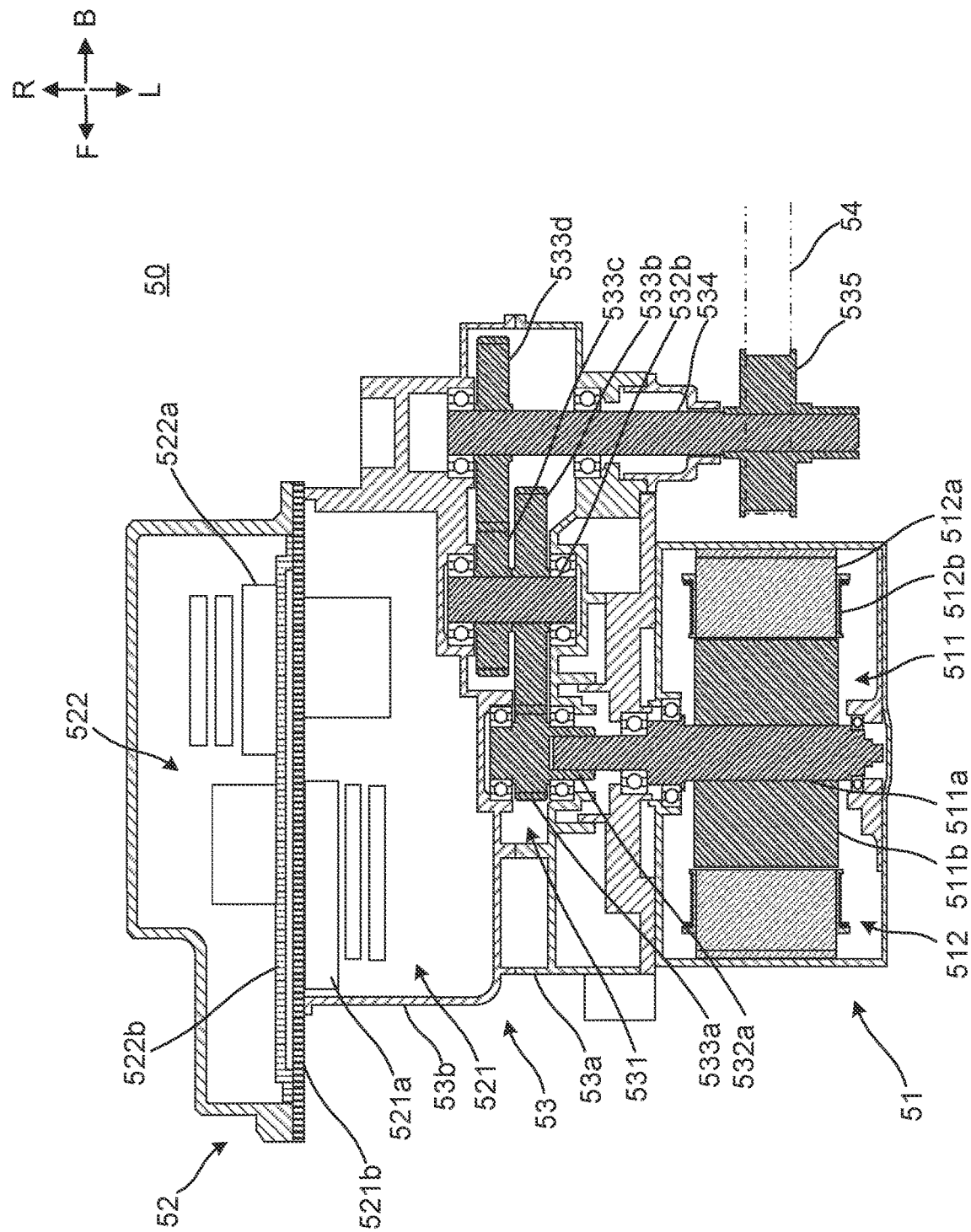
FIG. 3 A cross-sectional view as taken along the line I-I in FIG. 2

FIG. 2 is a left side view of the drive unit 50 of the straddled vehicle 1 shown in FIG. 1. FIG. 3 is a cross-sectional view as taken along the line I-I in FIG. 2.

The drive motor 51 of the drive unit 50 is a permanent magnet type three-phase brushless type motor. The drive motor 51 functions also as a permanent magnet type three-phase brushless type electric power generator. The drive motor 51 includes a rotor 511 and a stator 512. The drive motor 51 of this embodiment is of radial gap type. The drive motor 51 is of inner rotor type. Thus, the rotor 511 is an inner rotor. The stator 512 is an outer stator.

The rotor 511 has a drive shaft 511a and two or more permanent magnet parts 511b. The two or more permanent magnet parts 511b are disposed on an outer peripheral surface of the drive shaft 511a. The two or more permanent magnet parts 511b are disposed with N-pole and S-pole alternately arranged in the circumferential direction of the drive motor 51. The two or more permanent magnet parts 511b are disposed closer to the center of the drive motor 51 than the stator 512 with respect to the radial direction of the drive motor 51. The rotor 511 does not have a winding to which a current is supplied.

The stator 512 has a stator core 512a and multiphase stator windings 512b. The stator core 512a is composed of a yoke having a cylindrical shape and a plurality of teeth arranged at intervals in the circumferential direction of the yoke, the teeth being provided so as to integrally extend toward the radial center. Each of the stator windings 512b is wound on each of the teeth. Each of the stator windings 512b belongs to any of U-phase, V-phase, or W-phase. The stator windings 512b are arranged in the order of U-phase, V-phase, and W-phase, for example.

The drive motor 51 serves as a vehicle driving motor, to drive the rear wheel 32. In this case, the drive motor 51 is supplied with electric power from the power source unit 40. The drive motor 51 uses the supplied electric power to output rotational power, and drives the rear wheel 32 via the rotational power transmission mechanism 531 in the gear box 53.

The control unit 52 of the drive unit 50 includes a drive control unit 521. The drive control unit 521 includes an inverter module 521a and an attachment board 521b, the inverter module 521a including an inverter and a motor controller. The inverter module 521a is attached to the attachment board 521b of the drive control unit 521.

The drive motor 51 and the power source unit 40 are connected to the inverter module 521a of the drive control unit 521. The inverter of the inverter module 521a has a plurality of switching parts. Each of the switching parts is connected to each phase (U-phase, V-phase, or W-phase) of the multiphase stator windings 512b.

The passing of a current between the multiphase stator windings 512b and the power source unit 40 is selectively allowed or blocked by on/off-operation of the switching parts. By switching on/off the switching parts one after another, a current and a voltage outputted from the power source unit 40 are converted into a three-phase AC. A current sensor, which is disposed on a line connecting the inverter module 521a of the drive control unit 521 to the stator windings 512b, detects two-phase currents in the drive motor 51. The motor controller of the drive control unit 521 controls operations of the drive motor 51 by controlling on/off-operation of each switching part of the inverter.

In this embodiment, the control unit 52 further includes a power source control unit 522 in a case where the straddled vehicle 1 is configured as a series hybrid type straddled vehicle by using the electric power generation unit 40a as the power source unit 40. The power source control unit 522 will be described later.

The gear box 53 of the drive unit 50 is configured such that in the front-back direction FB of the straddled vehicle 1 including the frontward direction F and the backward direction B, a portion of the gear box 53 toward the frontward direction F is rigidly fixed to the frame body 11, while a portion of the gear box 53 toward the backward direction B supports the rear arm 31 swingably. In the straddled vehicle 1, the gear box 53 is fixed to the frame body 11, and the gear box 53 and the frame body 11 constitutes the frame structure 10. In the straddled vehicle 1, the frame body 11 is fixed to the gear box 53, which is a highly rigid part, and therefore the rigidity of the frame structure 10 can be enhanced by the gear box 53 and the frame body 11. Accordingly, in the straddled vehicle 1, a compact and strong vehicle body can be obtained, and furthermore a versatile vehicle body that is compatible with various rotational power systems can be obtained.

The gear box 53 of the drive unit 50 includes a left gear case 53a and a right gear case 53b. The gear box 53 is composed of left and right split type gear cases. The gear box 53 is formed such that a mating surface between the left gear case 53a and the right gear case 53b extends in the front-back direction FB. This allows the drive motor 51 and the control unit 52 to be easily supported by left and right portions of the gear box 53, so that a compact vehicle body can be obtained.

The gear box 53 of the drive unit 50 accommodates the rotational power transmission mechanism 531. The rotational power transmission mechanism 531 is a speed reducer that reduces the speed of power outputted from the drive motor 51 with a predetermined gear ratio, and transmits the resulting power to the rear wheel 32. The rotational power transmission mechanism 531 includes a first drive gear 533a, a first driven gear 533b, a second drive gear 533c, a second driven gear 533d, an input shaft 532a, a speed reduction shaft 532b, and an output shaft 534. The input shaft 532a is directly coupled to the drive shaft 511a of the drive motor 51. The first drive gear 533a is attached to the input shaft 532a. The first driven gear 533b and the second drive gear 533c are attached to the speed reduction shaft 532b. The second driven gear 533d is attached to the output shaft 534. A drive pulley 535 is attached to the output shaft 534. The input shaft 532a, the speed reduction shaft 532b, and the output shaft 534 are arranged in parallel or substantially in parallel to one another. The axis of the input shaft 532a, the axis of the speed reduction shaft 532b, and the axis of the output shaft 534 are not collinear, when viewed in the axial direction of the input shaft 532a, the axial direction of the speed reduction shaft 532b, and the axial direction of the output shaft 534. This can shorten the clearance between the input shaft 532a and the output shaft 534 in the gear box 53. Consequently, the gear box 53 can be compact.

Rotational power from the drive motor 51 is subjected to speed reduction through the first drive gear 533a and the first driven gear 533b, and then is received by the speed reduction shaft 532b. The rotational power received by the speed reduction shaft 532b is subjected to speed reduction through the second drive gear 533c and the second driven gear 533d, and then is received by the output shaft 534. The rotational power received by the output shaft 534 goes through the drive pulley 535 and a belt chain 54, and then is received by a drive shaft of the rear wheel 32 serving as the driving wheel.

Figure 4:
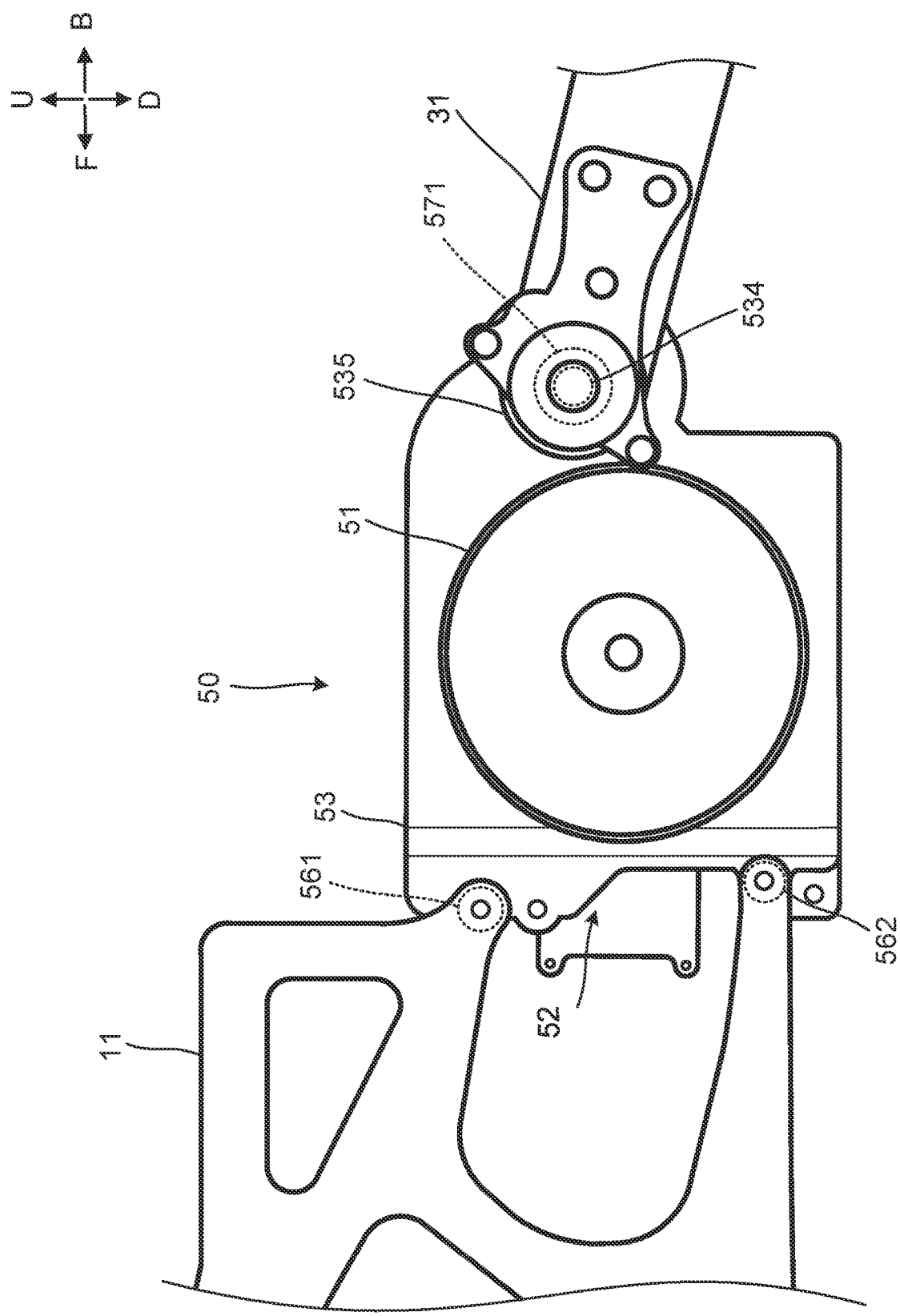
FIG. 4 A left side view showing the supporting relationship of a frame body, the drive unit, and a rear arm of the straddled vehicle shown in FIG. 1
Figure 5:
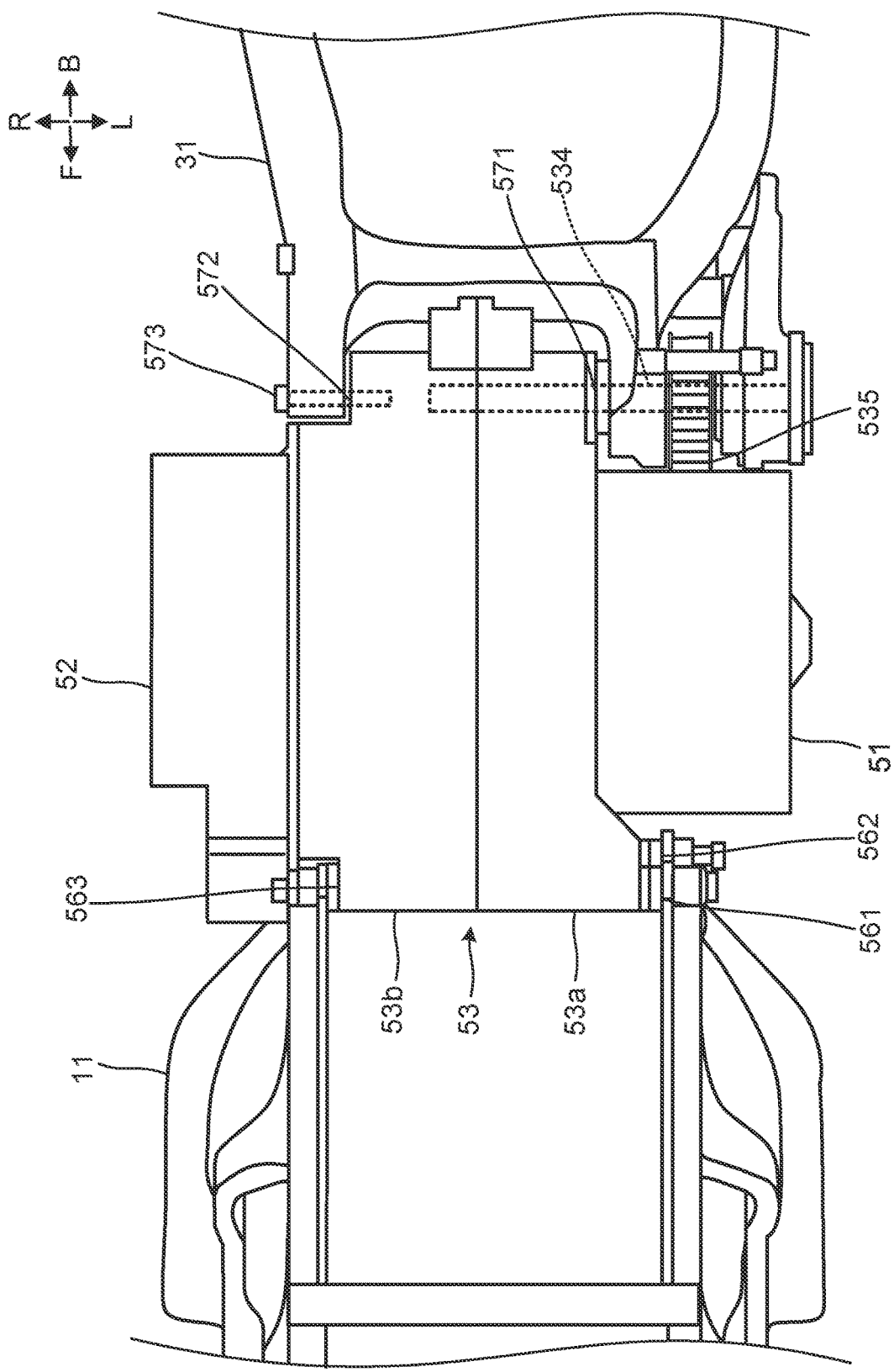
FIG. 5 A top plan view showing the supporting relationship of the frame body, the drive unit, and the rear arm of the straddled vehicle shown in FIG. 1
Figure 6:
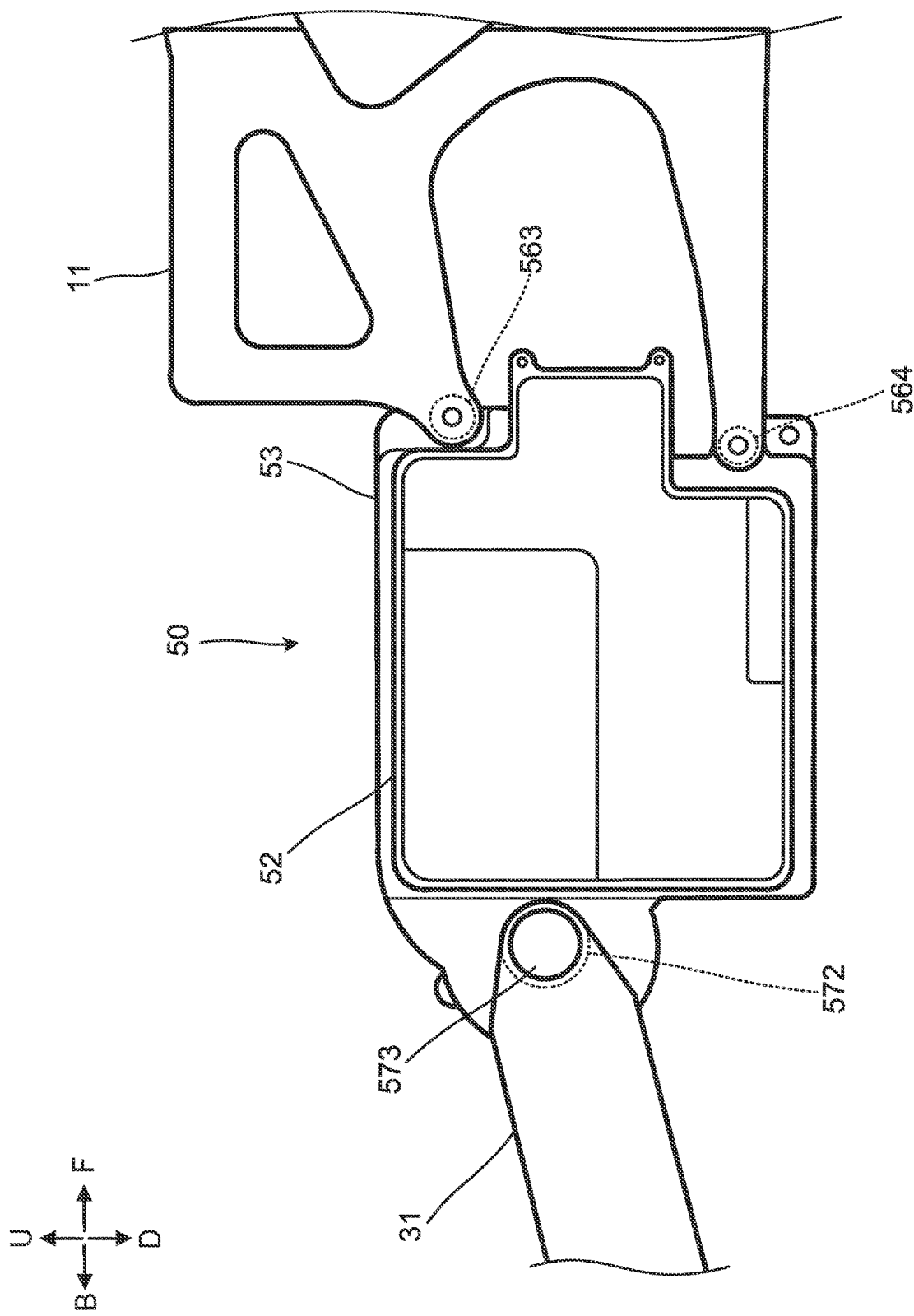
FIG. 6 A right side view showing the supporting relationship of the frame body, the drive unit, and the rear arm of the straddled vehicle shown in FIG. 1

FIG. 4 is a left side view showing the supporting relationship of the frame body 11, the drive unit 50, and the rear arm 31 of the straddled vehicle 1 shown in FIG. 1. FIG. 5 is a top plan view showing the supporting relationship of the frame body 11, the drive unit 50, and the rear arm 31 of the straddled vehicle 1 shown in FIG. 1. FIG. 6 is a right side view showing the supporting relationship of the frame body 11, the drive unit 50, and the rear arm 31 of the straddled vehicle 1 shown in FIG. 1. Referring to FIG. 4 to FIG. 6, the supporting relationship of the frame body 11, the drive unit 50, and the rear arm 31 will be described.

In the front-back direction FB of the straddled vehicle 1 including the frontward direction F and the backward direction B, the gear box 53 is rigidly fixed at four points to a rear end portion of the frame body 11. To be specific, the frame body 11 is in contact with and fixed to the gear box 53 at four points without interposition of any elastic member, the four points being attachment portions 561 to 564 of the gear box 53 shown in FIG. 4 to FIG. 6. The attachment portion 561 is disposed in an upper left portion of the gear box 53, and the attachment portion 562 is disposed in a lower left portion of the gear box 53. The attachment portion 563 is disposed in an upper right portion of the gear box 53, and the attachment portion 564 is disposed in a lower right portion of the gear box 53. Supporting is implemented by fixing with bolts, for example.

Since the gear box 53 is rigidly fixed to the frame body 11, the gear box 53 and the frame body 11 are unified to constitute the frame structure 10. Thus, the gear box 53 partners with the frame body 11 to form a framework of the straddled vehicle 1, and can bear loads from the front wheel 22, the rear wheel 32, and the power source unit 40.

Referring to FIG. 4 to FIG. 6, the rear arm 31 is swingably supported by the gear box 53 at two points, namely, attachment portions 571 and 572 disposed in the gear box 53. The attachment portion 571 is disposed in a left portion of the gear box 53, and the attachment portion 572 is disposed in a right portion of the gear box 53. In detail, the output shaft 534 of the rotational power transmission mechanism 531 penetrates through the attachment portion 571 and the rear arm 31. An attachment bolt 573 (see FIG. 5), which penetrates through the rear arm 31, is received in the attachment portion 572 of the gear box 53.

The frame structure 10 and the rear arm 31 are connected to each other by a damping device (not shown). The damping device absorbs vibration given from the rear arm 31. This reduces vibration that is transmitted from the rear wheel 32 to the frame structure 10 via the rear arm 31.

In the straddled vehicle 1 of this embodiment, the gear box 53 is fixed to the frame body 11, and the gear box 53 and the frame body 11 constitute the frame structure 10. In the straddled vehicle 1, the frame body 11 is fixed to the gear box 53, which is a highly rigid part, and therefore the rigidity of the frame structure 10 can be enhanced by the gear box 53 and the frame body 11. The straddled vehicle 1 has, as its component parts, the drive motor 51, the control unit 52, and the gear box 53 fixed to the frame body 11, which are rotational power components common to a hybrid vehicle and an electric vehicle.

Accordingly, by attaching parts corresponding to various rotational power systems to the frame structure 10, the straddled vehicle 1 is allowed to be compatible with the various rotational power systems. In this embodiment, in a case where the electric power generation unit 40a including the electric power generation engine 41, the electric power generator 42, and the battery 43 serves as the power source unit 40 mounted to the straddled vehicle 1, the straddled vehicle 1 can be configured as a series hybrid type straddled vehicle. In a case where the battery unit 40b consisting of the battery 44 alone serves as the power source unit 40 mounted to the straddled vehicle 1, the straddled vehicle 1 can be configured as an electric type straddled vehicle. Accordingly, in the straddled vehicle 1, a compact and strong vehicle body can be obtained, and furthermore a versatile vehicle body that is compatible with various rotational power systems can be obtained. In the following, Case 1 where the straddled vehicle 1 is configured as a series hybrid type straddled vehicle and Case 2 where the straddled vehicle 1 is configured as an electric type straddled vehicle will be separately described in detail.

Figure 7:
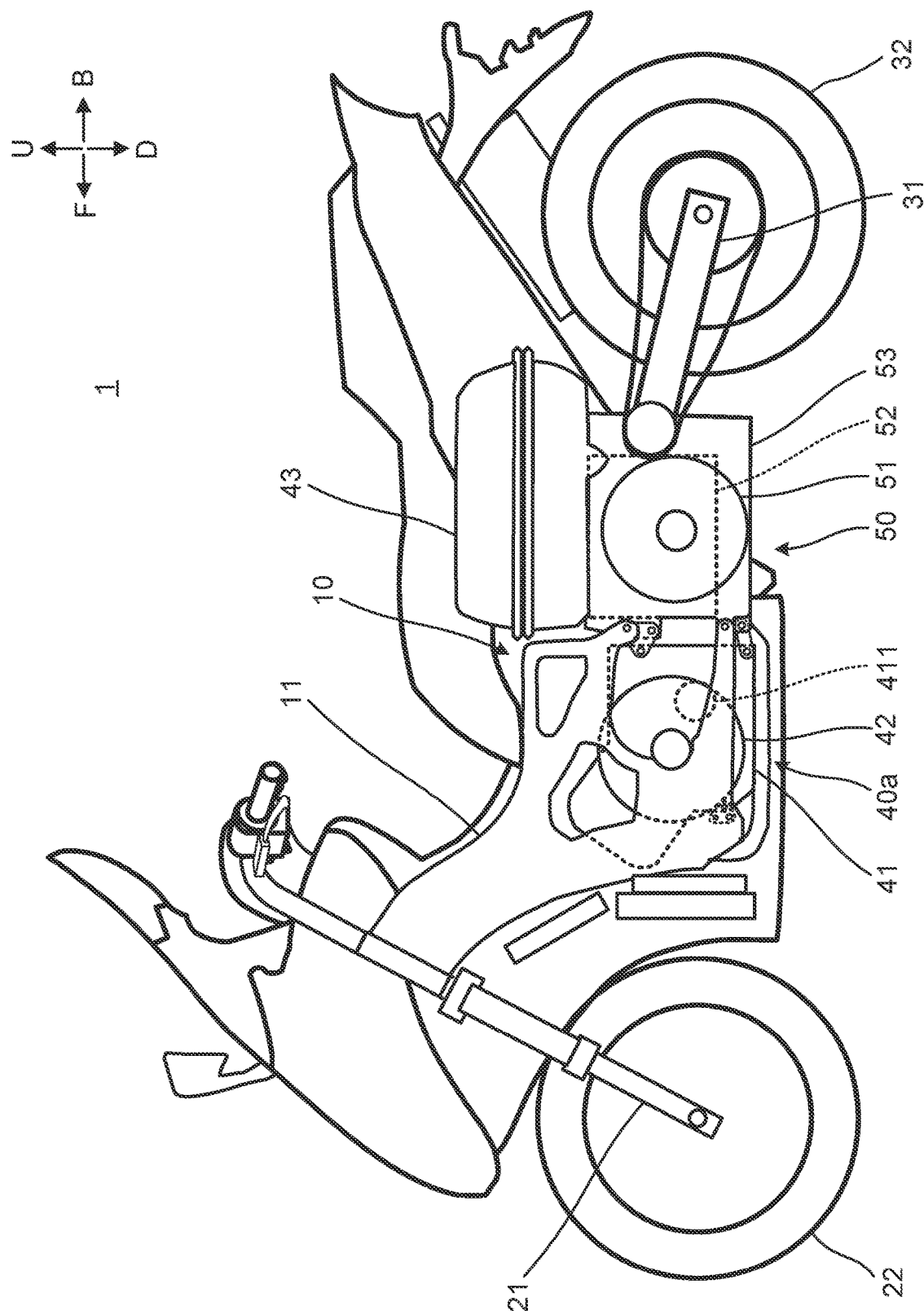
FIG. 7 A left side view of a straddled vehicle that is the straddled vehicle shown in FIG. 1 being configured as a series hybrid type straddled vehicle FIG. 8 A left side view showing a power source unit of the straddled vehicle shown in FIG. 7

Case 1: The Straddled Vehicle 1 is Configured as a Series Hybrid Type Straddled Vehicle FIG. 7 is a left side view of a straddled vehicle 1 that is the straddled vehicle 1 shown in FIG. 1 being configured as a series hybrid type straddled vehicle. FIG. 7 shows a state where a left one of vehicle body coverings in the left-right direction of the straddled vehicle 1 is removed.

The electric power generation unit 40a includes the electric power generation engine 41, the electric power generator 42, and the battery 43. The electric power generation engine 41 has a rotatable crankshaft 411. The electric power generation engine 41 generates power by gas combustion, and outputs the power in the form of a torque and a rotation speed of the crankshaft 411.

The electric power generator 42 is provided so as to be in conjunction with the crankshaft 411. The electric power generator 42 is driven by the electric power generation engine 41, to generate electric power for driving the drive motor 51.

The battery 43 stores electric power generated by the electric power generator 42.

Electric power generated by the electric power generator 42 and electric power in the battery 43 are supplied to the drive motor 51 of the drive unit 50. With the electric power supplied, the drive motor 51 outputs rotational power to drive the rear wheel 32.

Figure 8:
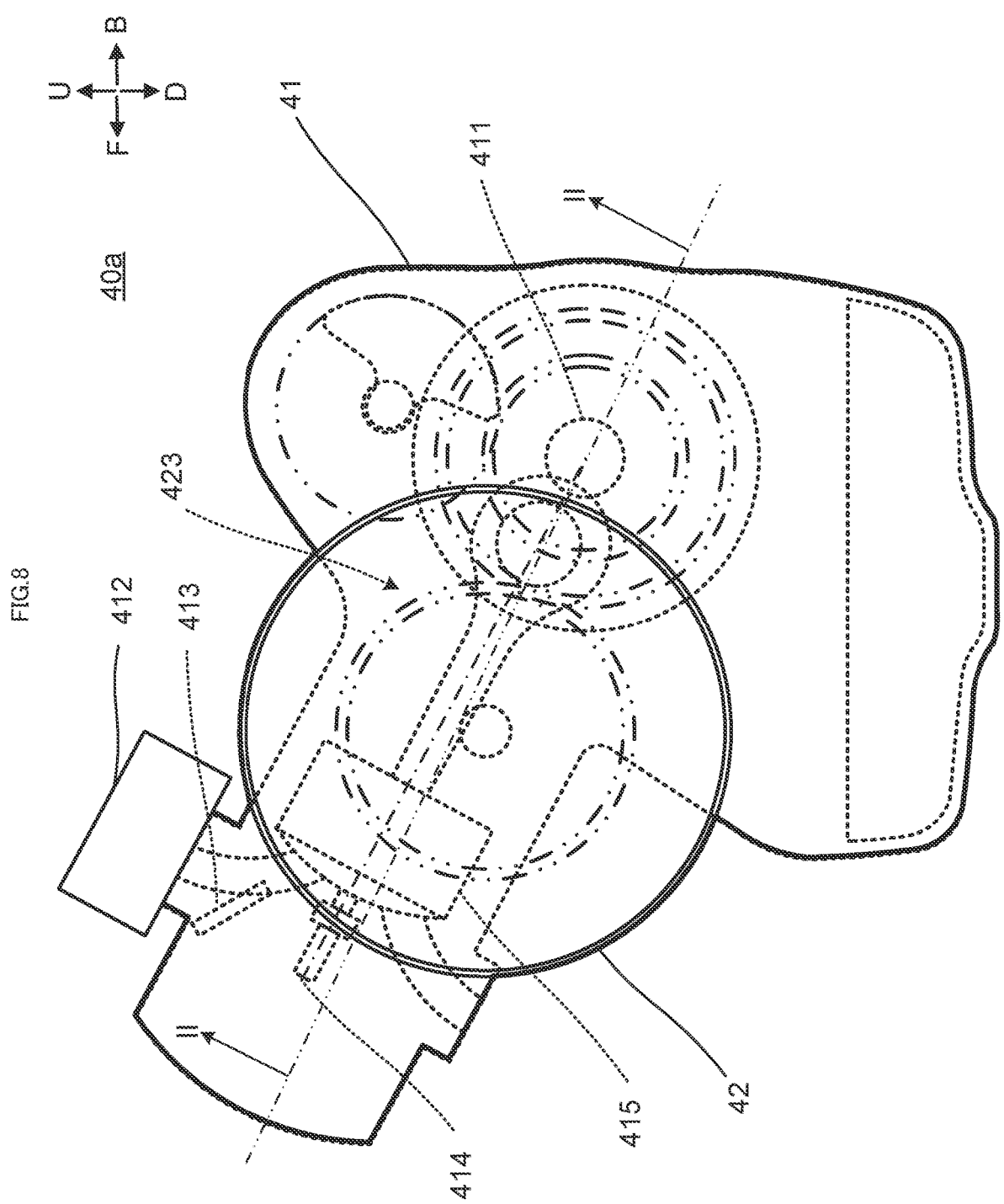
Figure 9:
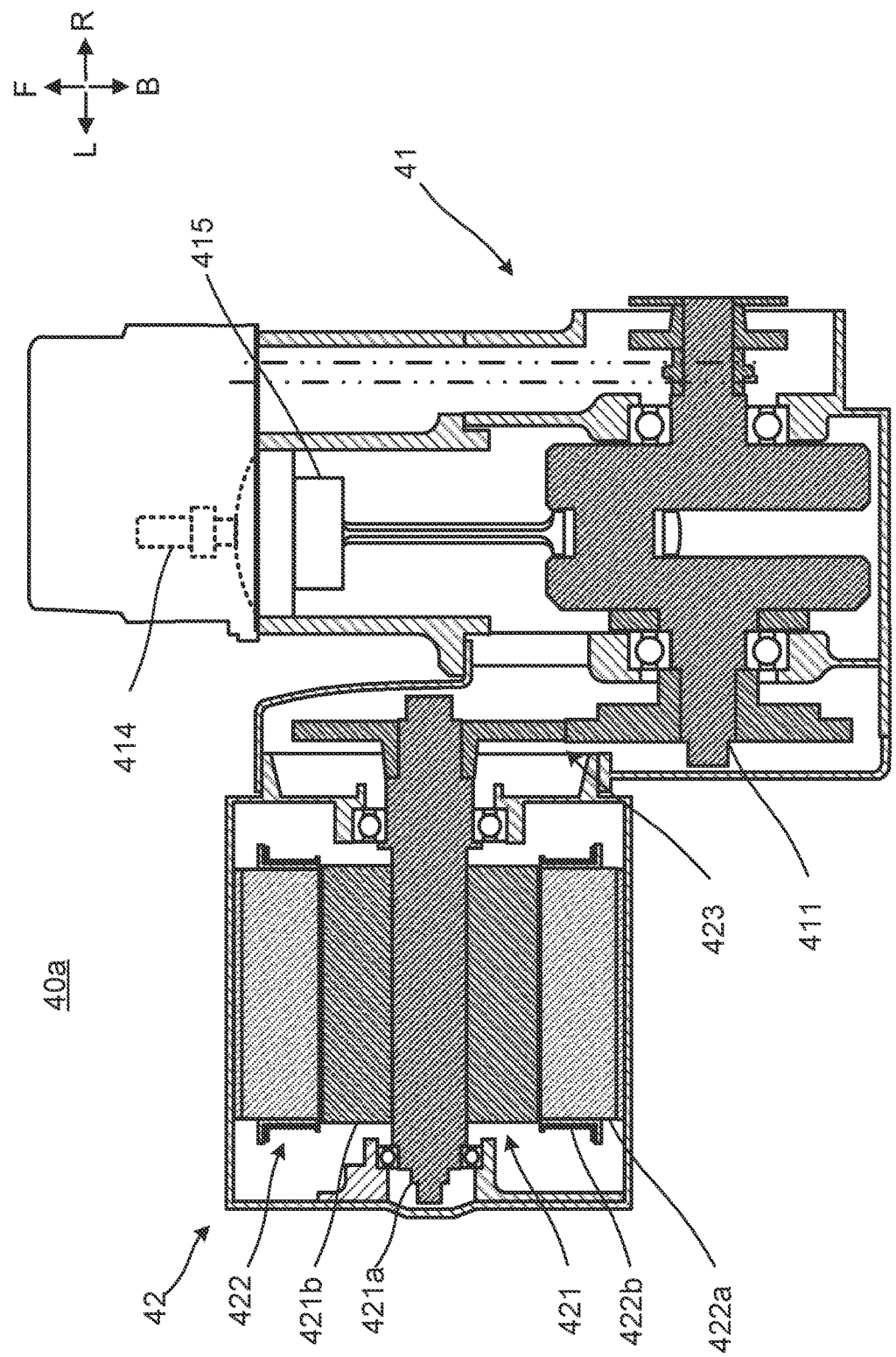
FIG. 9 A cross-sectional view as taken along the line II-II in FIG. 8

FIG. 8 is a left side view showing the electric power generation engine 41 and the electric power generator 42 of the electric power generation unit 40a of the straddled vehicle 1 shown in FIG. 7. FIG. 9 is a cross-sectional view as taken along the line II-II in FIG. 8.

The electric power generation engine 41 includes a throttle valve 412, a fuel injection device 413, a spark plug 414, and a piston 415. The electric power generation engine 41 is an internal combustion engine. The electric power generation engine 41 performs combustion operation for burning a fuel/air mixture gas, to cause the piston 415 to move up and down, thus applying rotational power to the crankshaft 411. In this manner, the electric power generation engine 41 outputs rotational power. The throttle valve 412 and the fuel injection device 413 adjust rotational power to be outputted from the electric power generation engine 41, by regulating the amounts of the air and fuel supplied. The rotational power outputted from the electric power generation engine 41 is converted into electric power by the electric power generator 42. The electric power obtained by conversion in the electric power generator 42 is supplied to the drive motor 51 (see FIG. 7), and is outputted as rotational power again.

The electric power generator 42 is a permanent magnet type three-phase brushless type electric power generator. The electric power generator 42 includes a rotor 421 and a stator 422. The electric power generator 42 of this embodiment is of radial gap type. The rotor 421 is an inner rotor. The stator 422 is an outer stator. Thus, the electric power generator 42 is of inner rotor type.

The rotor 421 includes a driven shaft 421a and two or more permanent magnet parts 421b. The two or more permanent magnet parts 421b are disposed on an outer periphery of the driven shaft 421a. The two or more permanent magnet parts 421b are disposed with N-pole and S-pole alternately arranged in the circumferential direction of the electric power generator 42. The two or more permanent magnet parts 421b are disposed closer to the center of the electric power generator 42 than the stator 422 with respect to the radial direction of the electric power generator 42.

The stator 422 has a stator core 422a and multiphase stator windings 422b. The stator core 422a has a yoke having a cylindrical shape and a plurality of teeth arranged at intervals in the circumferential direction of the yoke, the teeth being provided so as to extend inward. Each of the stator windings 422b is wound on each of the teeth. Each of the stator windings 422b belongs to any of U-phase, V-phase, or W-phase. The stator windings 422b are arranged in the order of U-phase, V-phase, and W-phase, for example.

In this embodiment, the electric power generator 42 is interlockingly connected to the crankshaft 411 of the electric power generation engine 41 via a rotational power transmission mechanism 423. More specifically, the rotor 421 is connected to the crankshaft 411 such that the rotor 421 rotates at a fixed speed ratio relative to the crankshaft 411. When the electric power generation engine 41 performs the combustion operation, the electric power generator 42 is driven by the electric power generation engine 41, to generate electric power.

The electric power generation engine 41 of the electric power generation unit 40a does not constitute the frame structure 10, but is supported by the frame structure 10. To be specific, the electric power generation engine 41 of the electric power generation unit 40a is attached to at least either one of the drive unit 50 or the frame body 11 of the frame structure 10 via an elastic member such as a rubber. In this embodiment, the electric power generation engine 41 is attached at four points to the frame body 11 and the drive unit 50. Since the electric power generation unit 40a is attached to the frame body 11 in this manner, transmission of vibration from the electric power generation engine to the frame structure 10 can be suppressed. The battery 43 is fixed to at least either one of the drive unit 50 or the frame body 11 of the frame structure 10. The battery 43 can be configured so as not to constitute the framework of the vehicle body. Accordingly, the battery 43 can be configured to receive loads lower than loads that the frame structure 10 receives from the front wheel 22 and the rear wheel 32, or not to receive any load from the front wheel 22 and the rear wheel 32.

In a case of the straddled vehicle 1 being configured as a series hybrid type straddled vehicle, the control unit 52 further includes the power source control unit 522 (see FIG. 3). The power source control unit 522 includes a converter module 522*a* and an attachment board 522*b*, the converter module 522*a* including a converter and an electric power generation controller. The converter module 522*a* is attached to the attachment board 522*b* of the power source control unit 522. The attachment board 522*b* may be either the same as or separate from the attachment board 521*b* of the drive control unit 521.

Connected to the converter module 522*a* of the power source control unit 522 are the electric power generator 42 and the battery 43 of the electric power generation unit 40*a*. The converter of the converter module 522*a* includes a plurality of switching parts that constitute a three-phase bridge inverter. Each of the switching parts is connected to each phase (U-phase, V-phase, or W-phase) of the multiphase stator windings 422*b*.

The passing of a current between the multiphase stator windings 422*b* of the electric power generator 42 and the battery 43 and/or the drive motor 51 is selectively allowed or blocked by on/off-operation of the switching parts. By switching on/off the switching parts one after another, a voltage control and a rectification are performed on a three-phase AC outputted from the electric power generator 42. A current sensor, which is disposed on a line connecting the converter module 522*a* of the power source control unit 522 to the stator windings 422*b*, detects two-phase currents in the electric power generator 42.

The electric power generation controller of the power source control unit 522 controls operations of the electric power generator 42 by controlling on/off-operation of each switching part of the converter.

[Variation 1]

The electric power generation unit 40*a* is rigidly fixed to the frame body 11, so that the electric power generation unit 40*a* is a composition member of the frame body. In detail, the electric power generation unit 40*a* is attached at three or more points to the frame body 11 of the frame structure 10 without interposition of an elastic member such as a rubber. The electric power generation unit 40*a* is supported by the frame body 11 and the drive unit 50 so that the electric power generation unit 40*a* constitutes a part of the frame structure 10. Accordingly, the electric power generation unit 40*a* bears a load from the front wheel 22 via the front fork 21, and bears a load from the rear wheel 32 via the rear arm 31. This can further enhance the rigidity of the frame structure 10.

[Variation 2]

If the battery 43 is allowed to be supplied with electric power from a power source different from the electric power generator 42 of the electric power generation unit 40*a*, the straddled vehicle 1 can be configured as an electric type straddled vehicle equipped with a range extender. In this configuration, examples of the power source different from the electric power generator 42 include a home power source and a power source installed in an electric car charging station.

Figure 10:
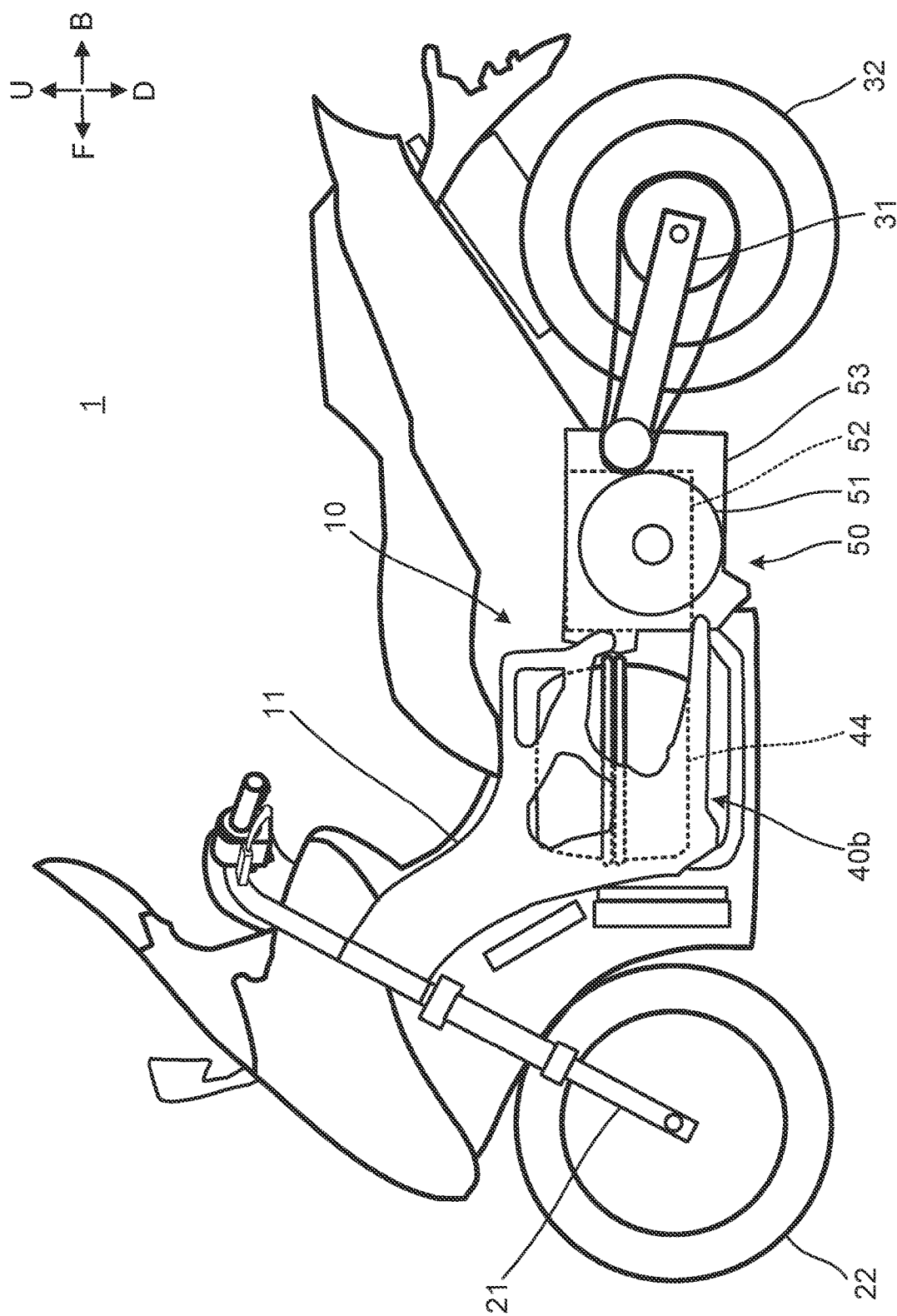
FIG. 10 A left side view of a straddled vehicle that is the straddled vehicle shown in FIG. 1 being configured as an electric type straddled vehicle

Case 2: The Straddled Vehicle 1 is Configured as an Electric Type Straddled Vehicle FIG. 10 is a left side view of a straddled vehicle 1 that is the straddled vehicle 1 shown in FIG. 1 being configured as an electric type straddled vehicle. FIG. 10 shows a state where a left one of vehicle body coverings in the left-right direction of the straddled vehicle 1 is removed.

The power source unit 40 (see FIG. 1) of this embodiment is a battery unit 40*b* including one or more batteries 44. The battery unit 40*b* is supported by the frame structure 10. More specifically, the battery unit 40*b* is fixed to the frame body 11 of the frame structure 10. The fixing is implemented by attaching the battery unit 40*b* at three or more points to the frame body 11 such that the battery unit 40*b* is in contact with the frame body 11 without interposition of an elastic member such as a rubber. The battery unit 40*b* can be configured so as not to constitute the framework of the vehicle body. In this case, the battery 44 can be configured to receive loads lower than loads that the frame structure 10 receives from the front wheel 22 and the rear wheel 32, or not to receive any load from the front wheel 22 and the rear wheel 32. The battery unit 40*b* is not supported by the rear arm In this embodiment, the battery unit 40*b* supplies electric power to the drive motor 51 via the drive control unit 521 of the control unit 52. With the electric power supplied, the drive motor 51 outputs rotational power to drive the rear wheel 32.

[Variation 1]

The battery unit 40*b* can be configured so as to constitute the framework of the vehicle body. To be specific, the battery unit 40*b* can be attached to at least either one of the frame body 11 or the drive unit 50 so that the battery unit 40*b* constitutes a part of the frame structure 10. In this case, the battery 43 can be configured so as to bear a load from the front wheel 22 via the front fork 21, and bear a load from the rear wheel 32 via the rear arm 31.

REFERENCE SIGNS LIST 1 straddled vehicle
10 frame structure
11 frame body
21 front fork
22 front wheel
31 rear arm
32 rear wheel
40 power source unit
41 electric power generation engine
42 electric power generator
43, 44 battery
50 drive unit
51 drive motor
52 control unit
53 gear box

The invention claimed is:

1. A straddled vehicle comprising:
a frame structure including a frame body;
a rear arm swingably supported by the frame structure;
a driving wheel rotatably supported by the rear arm;
a power source unit supported by the frame structure, for supplying electric power; and
a drive unit including
a rotational power transmission mechanism,
a gear box supported by the frame body, and
a drive motor and a control unit that are supported by the gear box,
the drive motor being configured to receive the electric power supplied from the power source unit and to drive the driving wheel, the control unit being configured to control the electric power to be supplied from the power source unit to the drive motor, the gear box accommodating the rotational power transmission mechanism, and the rotational power transmission mechanism being configured to shift a speed of power outputted from the drive motor with a predetermined gear ratio, and to transmit resulting power to the driving wheel, wherein
the drive motor is arranged with an offset toward a first direction from a center of the straddled vehicle with respect to a left-right direction of the straddled vehicle, and is arranged not to overlap the power source unit when viewed in the left-right direction,
the control unit is positioned further in a second direction than the drive motor, and is arranged to overlap the drive motor, but not to overlap the power source unit, when viewed in the left-right direction, the second direction being in the left-right direction and being opposite to the first direction,
the gear box is positioned further in the second direction than the drive motor, and is arranged to overlap the drive motor when viewed in the left-right direction, and
the gear box is also positioned further in the first direction than the control unit, and is arranged to overlap with the control unit, but not to overlap the power source unit, when viewed in the left-right direction, wherein:
the power source unit includes
an electric power generation engine having a rotatable crankshaft, the electric power generation engine being configured to generate power by gas combustion, and to output the rotational power in a form of a torque and a rotation speed of the crankshaft,
an electric power generator that is provided in conjunction with the crankshaft, the electric power generator being driven by the electric power generation engine, to generate the electric power, and
a battery;
the electric power generator supplies the electric power to the battery and/or the drive motor;
the battery is fixed to the frame structure; and
the control unit further controls the supplying of the electric power from the electric power generator to the battery and/or the drive motor.

2. The straddled vehicle according to claim 1, wherein the gear box is fixed to the frame body, to thereby form the frame structure along with the frame body.

3. The straddled vehicle according to claim 1, wherein the gear box has a gear case that is splitable in the left-right direction of the straddled vehicle.

4. The straddled vehicle according to claim 2, wherein the gear box has a gear case that is splitable in the left-right direction of the straddled vehicle.

5. The straddled vehicle according to claim 3, wherein the rotational power transmission mechanism includes an input shaft, a speed reduction shaft, and an output shaft, which are arranged in parallel or substantially in parallel to one another, and are not collinear when viewed in an axial direction of any of the input shaft, the speed reduction shaft, and the output shaft.

6. The straddled vehicle according to claim 4, wherein the rotational power transmission mechanism includes an input shaft, a speed reduction shaft, and an output shaft, which are arranged in parallel or substantially in parallel to one another, and are not collinear when viewed in an axial direction of any of the input shaft, the speed reduction shaft, and the output shaft.

7. The straddled vehicle according to claim 1, wherein the electric power generation engine is swingably supported by the frame structure, and does not constitute a part of the frame structure.

8. The straddled vehicle according to claim 1, wherein the electric power generation engine is fixed to the frame structure, to thereby form the frame structure along with the frame body.

9. The straddled vehicle according to claim 1, wherein the battery is chargeable by a power source that is different from the electric power generator.

10. The straddled vehicle according to claim 7, wherein the battery is chargeable by a power source that is different from the electric power generator.

11. The straddled vehicle according to claim 8, wherein the battery is chargeable by a power source that is different from the electric power generator.

12. The straddled vehicle according to any one of claims 1 to 6, wherein
the power source unit further includes a battery unit including the battery.

* * * * *